UNITED STATES PATENT OFFICE.

JOSEPH W. WATTLES, OF CANTON, MASSACHUSETTS.

IMPROVEMENT IN SIZING.

Specification forming part of Letters Patent No. 172,216, dated January 11, 1876; application filed April 14, 1875.

*To all whom it may concern:*

Be it known that I, JOSEPH W. WATTLES, of Canton, of the county of Norfolk and State of Massachusetts, have invented a new and useful Improvement in the Manufacture or Preparation of Starch for Sizing or Warp-Dressing; and do hereby declare the same to be fully described in the following specification.

The article in question is not a solution of starch, but is a solid in the state of powder, lump, or block, and is to be used in the manufacture of a starch, sizing, or dressing for warps. It consists of acetic acid and dry starch, in, or about in, the proportions of one pound of acid to four pounds of starch. The acid is to be thoroughly mixed with the starch, in which case the latter will be reduced to or in the state of flour or powder, in a dry or nearly dry state, capable of being put up in packages or barrels, as ordinary wheat-flour may be.

The composition is to be used in making with water a sizing or warp-dressing, in the same manner as common starch is generally converted into such, the acid not only preserving the starch in a dry state from fermentation or becoming sour, but completely does this when it is reduced by means of water to sizing or warp-dressing, and also prevents the warps from mildewing. It saves the necessity of thoroughly drying the sized yarns before using such in a loom or other machine, as they, when dressed with the acidulated starch solution, may be run into the loom and woven in a damp state without danger of mildew or sticking together.

I do not claim the mere mixture of a solution of starch and acetic acid, as in making my new article of manufacture I combine the acetic acid with the starch in a solid or dry state, or without any addition of water, and thus produce an article that not only can be transported from place to place and kept free of danger of souring or fermenting, but one which not only saves all necessity to the manufacturer of purchasing acid separate from his starch, but enables him to make his warp-dressing with no more labor than with starch alone. Other great advantages also arise from my new article or invention.

It is found in practice that with the acid in the solution of starch only about two-thirds the amount of starch becomes necessary in making a warp-dressing that would be required with starch alone. It is also found that the starch prepared with the acid is not liable to be eaten by rats, mice, or insects, or is effectually preserved from their depredations.

I do not herein claim a liquid warp-dressing composed of starch, acetic acid, and water, as I have claimed such in Letters Patent No. 168,435, dated October 5, 1875, and granted to me; but

I claim—

A new manufacture for conversion with water into a sizing or a dressing for warps, consisting of acetic acid and dry starch, all being substantially as set forth.

JOSEPH W. WATTLES.

Witnesses:
R. H. EDDY,
J. R. SNOW.